US006522953B1

(12) United States Patent
Schneider

(10) Patent No.: US 6,522,953 B1
(45) Date of Patent: Feb. 18, 2003

(54) THERMAL POLYMER CLAMPING TOOL

(75) Inventor: Edward T. Schneider, Eastlake, OH (US)

(73) Assignee: TCAM Power Workholding LLC, Mentor, OH (US)

(*) Notice: Subject to any disclaimer, the term of this patent is extended or adjusted under 35 U.S.C. 154(b) by 0 days.

(21) Appl. No.: 09/383,834

(22) Filed: Aug. 26, 1999

Related U.S. Application Data

(60) Provisional application No. 60/099,441, filed on Sep. 8, 1998.

(51) Int. Cl.[7] .......................... G05B 15/00; B23Q 3/00; B25B 1/00

(52) U.S. Cl. ......................... 700/275; 700/260; 60/527; 269/25; 269/157

(58) Field of Search ..................... 60/527, 528; 269/25, 269/157; 700/60, 114, 159, 169, 275, 281, 299, 160, 260, 261

(56) References Cited

U.S. PATENT DOCUMENTS

| | | | |
|---|---|---|---|
| 2,810,290 A | * 10/1957 | Scherer | 60/527 |
| 4,016,722 A | 4/1977 | Niederer, Sr. | 60/531 |
| 4,545,106 A | * 10/1985 | Juengel | 29/563 |
| 4,759,189 A | * 7/1988 | Stropkay et al. | 219/504 |
| 4,899,543 A | * 2/1990 | Romanelli et al. | 60/527 |
| 5,088,361 A | * 2/1992 | Kojima et al. | 29/27 R |
| 5,100,270 A | * 3/1992 | Dowdle et al. | 144/252.1 |
| 5,177,969 A | * 1/1993 | Schneider | 60/527 |
| 5,914,880 A | * 6/1999 | Yasojima et al. | 700/108 |
| 6,064,747 A | * 5/2000 | Wills et al. | 382/100 |
| 6,147,422 A | * 11/2000 | Delson et al. | 273/148 R |

FOREIGN PATENT DOCUMENTS

| | | |
|---|---|---|
| EP | 0 834 380 | 4/1998 |
| FR | 2309738 | 11/1976 |
| JP | 55-060707 | 5/1980 |
| JP | 60-215111 | 10/1985 |

OTHER PUBLICATIONS

"Buck Tool Company" Advertising Brochure—pp 1–7, ©1998.

(List continued on next page.)

*Primary Examiner*—Leo Picard
*Assistant Examiner*—Paul Rodriguez
(74) *Attorney, Agent, or Firm*—Fay, Sharpe, Fagan, Minnich & McKee, LLP

(57) ABSTRACT

A workpiece is held between a movable clamping element (56) and a stationary clamping element (52). During setup, a hex drive (58) is rotated to move a traveler (100) which is connected to the movable clamping element along a threaded shaft (80). The threaded shaft is supported at one end through a spring retainer nut (88), a spring (86), and a bearing (82). After the movable clamping element engages the workpiece, the spring is compressed, limiting the amount of clamping force applied to the workpiece. The retainer nut (88) is selectively moved through the use of the tool to a selectable position along the threaded shaft (80) to adjust the spring compression, hence the clamping force. After initial setup, an electrochemical actuator (110) is actuated to melt a polymer, forcing a piston assembly (118, 120) and a bearing (84) to shift the threaded shaft (80) longitudinally against the spring, moving the clamping elements apart a short distance to release or receive a workpiece. The electrochemical actuator is then deactivated, allowing the spring to expand, clamping the workpiece between the clamping elements with the selected force. This enables an operator to load a workpiece manually into a vise (12) at a loading station (14). An automatic controller (30) controls a plurality of the vises, a moving table (10), a plurality of machine tools (18), and optionally, a robotic workpiece repositioning station (20).

18 Claims, 5 Drawing Sheets

OTHER PUBLICATIONS

"Chick Product Catalog"—Chick Workholding Solutions, Inc., pp 1–60 ©1997.
"Forkardt International—Staticlamp Manually Operated Flat–Clamping System" Advertising Brochure—©1997.
"Heinrich Company Catalog No. 198R" Heinrich Company, pp 1–51.
"Kurt Manufacturing Industrial Products Catalog" Kurt Manufacturing, Cat. ED. 01/99.
"Carr Lane Component Parts of Jigs and Fixtures" Product Catalog ©1998 Carr Lane Manufacturing Co.
"Toolex Vise Workholding Systems"—Advertising Brochure Te–Co ©1998 pp 1–39.

* cited by examiner

THERMAL POLYMER CLAMPING TOOL

This application claims the benefit under Title 35, U.S.C. §119(e) of U.S. Provisional patent application Serial No. 60/099,441, filed Sep. 8, 1998.

BACKGROUND OF THE INVENTION

The present invention relates to clamping devices. It finds particular application in conjunction with automated vises and will be described with particular reference thereto. It is to be appreciated, however, that the invention will find other applications in the machine tool, manufacturing, and other industries.

In the machine tool industry, parts are typically clamped in a vise or fixture and then subject to a metal removal or other manufacturing cycle. The accuracy with which the part is manufactured is dependent not only on the accuracy of the metal removal cycle, but also on the accuracy with which the part was positioned and held in the vise. Although the cutting cycles are nearly all automated, there is still a high level of manual loading and unloading of the raw and finished parts.

The loading and fixturing of parts for machining involves a wide diversity of vises, fixtures, and jigs with an equal diversity of loading techniques. A large portion of the clamping devices used as machine tool vises are capable of clamping a wide variety of parts. This facilitates a more rapid turn-around when changing the machine tool between machining runs for various parts.

Manual vises are in common use. Operators load the vise and manually torque the vise handle. First, this leads to repetitive motion injuries and operator fatigue. Operator fatigue, in turn, results in variable torquing of the vise handle. The variable torquing causes part distortion and poor tolerances in the machined part.

Some vises are hydraulically operated. However, hydraulic vises require large, cumbersome hydraulic hoses, expensive hydraulic power supplies, and control valves. The bulky hydraulics render hydraulic vises difficult to change-over to other types of parts. Moreover, hydraulic vises typically have hydraulic fluid leaks. When hydraulic fluid leaks, it contaminates the cutting fluids and the environment. Further, hydraulic vises have high maintenance costs and generate high noise levels.

Pneumatic vises also have shortcomings. First, pneumatic vises typically involve high noise levels, often exceeding OSHA limits. Moreover, pneumatic systems release oil mist into the air which creates the typical "shop air" smell. These oils contain carcinogens and are the subject of ongoing regulation efforts. Moreover, pneumatic systems require expensive compressors, filter/regulator packages, and maintenance. Finally, pneumatic vises have limited clamping forces.

In some automated machining operations, the vise and the workpiece are moved among one or more machining stations. Such movement is cumbersome with hydraulic and pneumatic power systems. Even though manual vises are not amenable to automated control and timing, the drawbacks of hydraulic and pneumatic vises are so great that manual vises are still in common usage.

The present invention contemplates a new and improved clamping device which overcomes the above problems and others.

SUMMARY OF THE INVENTION

In accordance with one aspect of the present invention, a clamping device is provided in which at least one of first and second clamping elements are movable between an open position for receiving a workpiece and a clamped position for holding the workpiece. A polymeric actuator controls movement of the clamping elements between the open and clamped positions. The polymeric actuator includes a housing that defines a polymer containing chamber. A polymer disposed in the chamber expands and contracts under heating and cooling. A driving element movably mounted in fluid communication with the chamber extends and retracts as the polymer expands and contracts. The driving element is connected with at least one of the clamping elements for driving the elements towards one of their open and clamped positions as the polymer expands.

In accordance with another aspect of the present invention, an electrically controlled actuator controls movement of the moveable clamping element(s) between the open and clamping positions.

In accordance with another aspect of the present invention, a machine tool system is provided. A plurality of clamping devices each include first and second clamping elements which selectively clamp workpieces. An electrochemical actuator is electrically controlled to move the gripping elements between open and clamping positions. At least one machine tool performs a material removal operation on the clamped workpiece. A computer controller is electrically connected with the machine tool and the clamping device for electrically controlling clamping and material removal operations.

In accordance with another aspect of the present invention, a polymeric actuator is provided. A generally circular bore is defined in a housing. An extensible and retractable drive element is slidably received in a drive element receiving port. A substantially circular bobbin is disposed eccentrically within the bore to define an annular polymer receiving chamber which is thicker toward the drive element receiving port and thinner opposite the drive element receiving port. A heat expansible polymer is disposed in the bore. A heater in thermal communication with the polymer selectively expands the polymer.

In accordance with another aspect of the present invention, a clamping method is provided. A clamping force biases the clamping element(s) toward the clamping position. A polymer is thermally expanded to move the clamping elements apart against the mechanical biased clamping force. A workpiece is placed between the clamping elements. The polymer is cooled and contracts such that the clamping elements are mechanically biased together to clamp the workpiece with the clamping force.

One advantage of the present invention is that it improves accuracy, creating uniform and repeatable clamping forces.

Another advantage of the present invention resides in shortened lead times with reduced loading and set up time.

Another advantage of the present invention is that it is electrically controlled. Hydraulic and pneumatic lines and associated overhead are eliminated.

Another advantage of the present invention is its safety to the operator. It is totally silent and does not leak hazardous fluids or mists into the environment.

Another advantage of the present invention resides in the simplified interface with automated machine tools.

Another advantage of the present invention resides in its simplicity.

Another advantage is that the clamping speed can be controlled at a rate slow enough to allow the operator to remove his/her fingers in time to avoid finger pinch situations, therefore improving operator safety.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
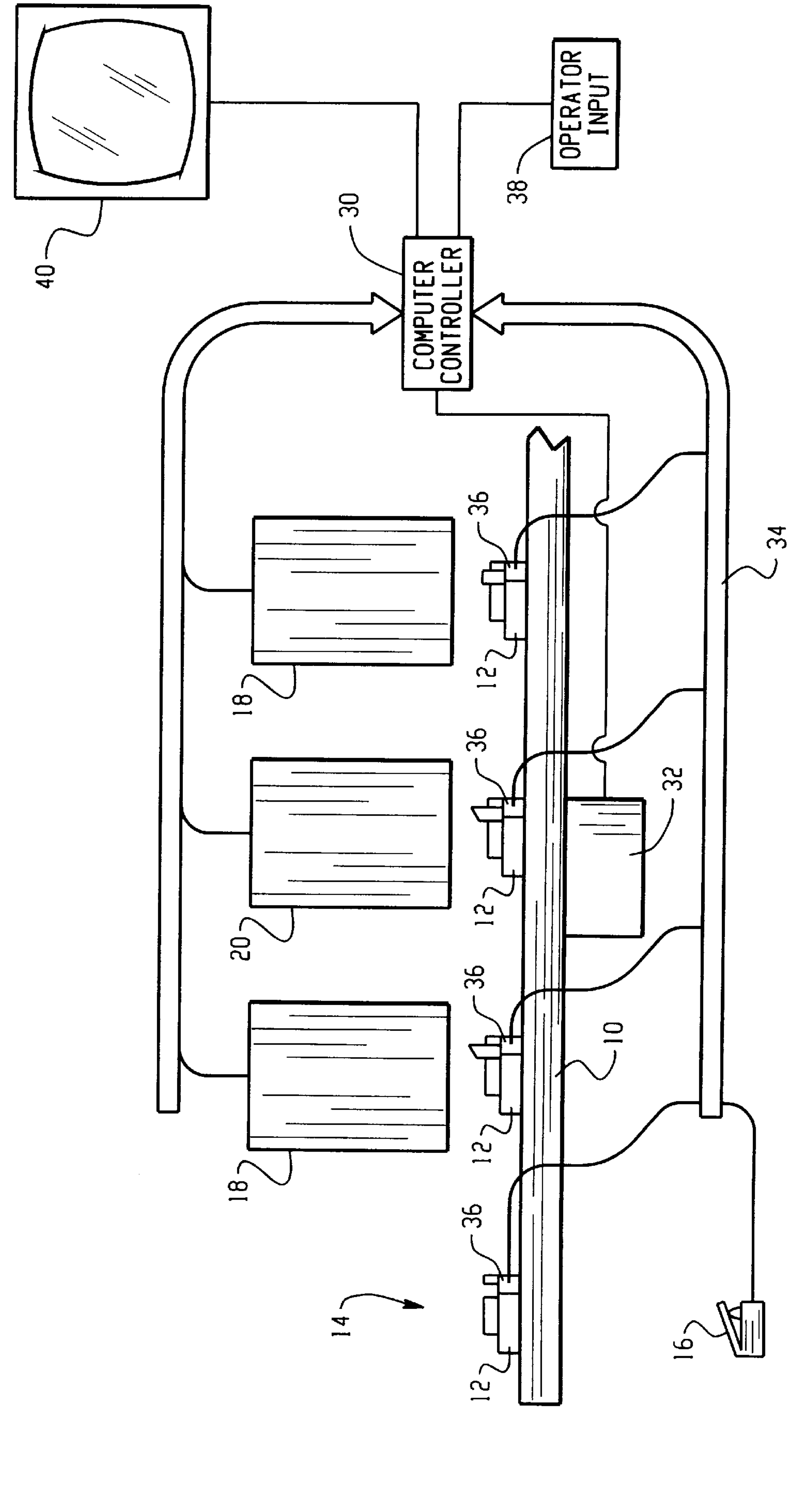
FIG. 1 is a diagrammatic illustration of a computer controlled vise and machine tool assembly.

With reference to FIG. 1, a moving platform 10, such as a rotating turret or linearly moving table, carries a plurality of electrically controlled vises 12. At a loading station 14, an operator (not shown) depresses a foot pedal 16 or other humanly controlled device to open each vise as it passes the loading station. After a workpiece is loaded into each vise, it is indexed to positions adjacent various machine tools 18 which perform cutting, drilling, and other operations on the workpiece. Optionally, the workpiece is also moved to a robotic workpiece repositioning or reorienting station 20.

A computer based controller 30 controls a motor 32 for moving or indexing the platform 10 and controls each of the machine tools 18 and the repositioning station 20. Optionally, the computer also receives information about the various machining operations from the individual machine tools or repositioning stations. The controller 30 also sends signals over a cable or bus 34 to the individual vises and, optionally, receives fed back information from the vises. In one embodiment, the controller 30 has individual lead wires going to each vise which are bundled together in a cable. In another embodiment, each vise includes a "smart" controller 36 with a unique identification. The controller sends out addressed signals along a common bus which are then recognized by the smart controllers 36 of the individual vises. An operator input 38 enables a human operator to program or otherwise input instructions into the automated controller 30. The automated controller 30 further outputs information to a video monitor, printer, or other human-readable display 40 to enable the human operator to monitor the ongoing operations. A printout or computer record can be maintained for each machined part for quality control purposes or the like.

Figure 2:
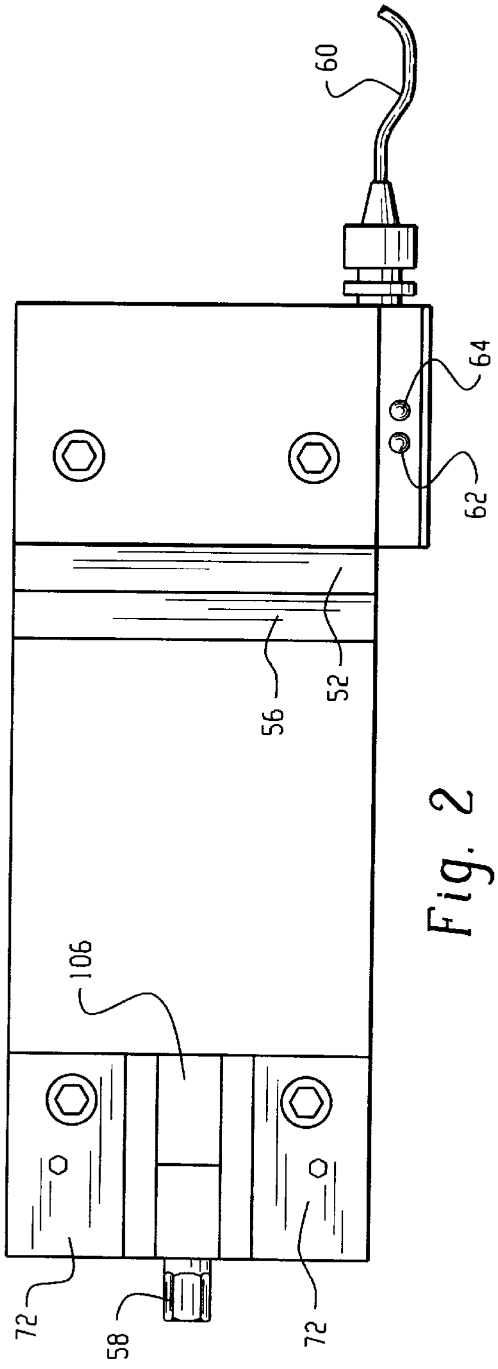
FIG. 2 is a top view of a preferred embodiment of the preferred vise.
Figure 3:
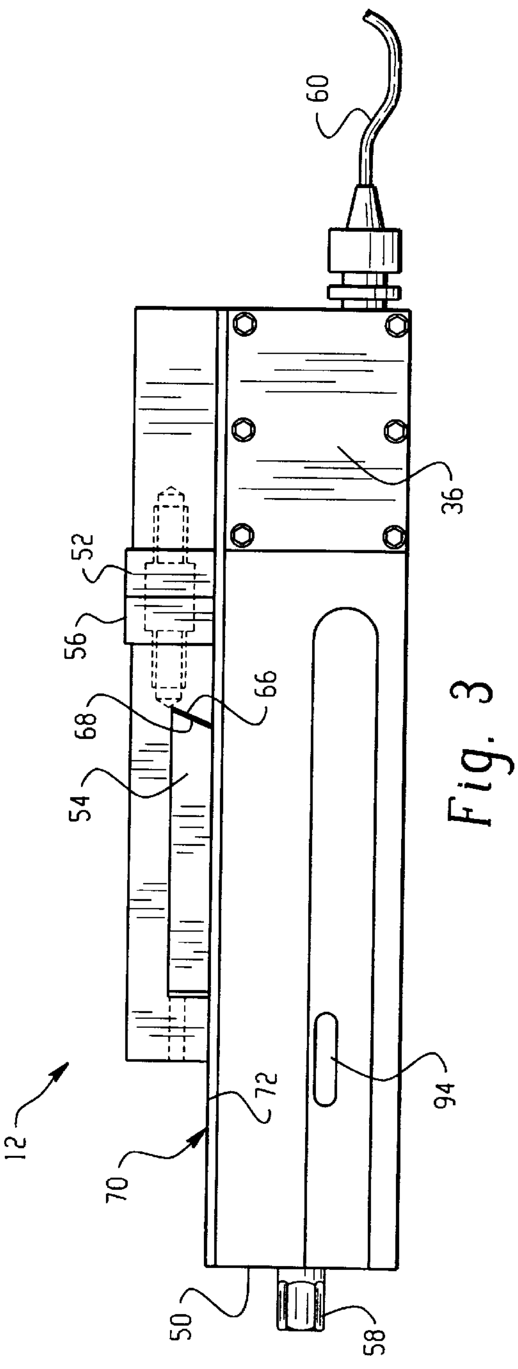
FIG. 3 is a side view of the vise of FIG. 2.

With reference to FIGS. 2 and 3, the vise 12 includes a vise body 50 in which the controller 36 is mounted. The body also supports a stationary or reference jaw 52. A wedge jaw carrier 54 carries a movable jaw 56. A jaw adjustment hex drive 58 selectively adjusts the closed position of the jaw in the preferred embodiment. In an alternate embodiment, the hex drive adjusts the open position of the jaw. The hex drive can also be used as a manual override to operate the vise manually. An electrical cord 60 provides electrical power and control signals to the vise and outputs feedback signals from the vise. Indicator lights 62, 64 provide direct operator viewable feedback regarding the state of the device, i.e., at full clamping pressure, under power, or the like.

The wedge jaw carrier has a sloping, cam surface 66 at its leading edge which engages an oppositely sloping cam surface 68 on the movable jaw. In this manner, as the jaw is urged into the clamping position, the movable jaw is urged downward. The movable jaw has a lower surface on either side of the jaw carrier which engages flat upper surfaces 70 of the jaw body. Preferably, the upper surfaces of the jaw body are coated with a low friction material 72. In this manner, the movable jaw is held to an accurately constrained vertical position to prevent the workpiece from being cammed upward as the jaw locks.

Figure 4:
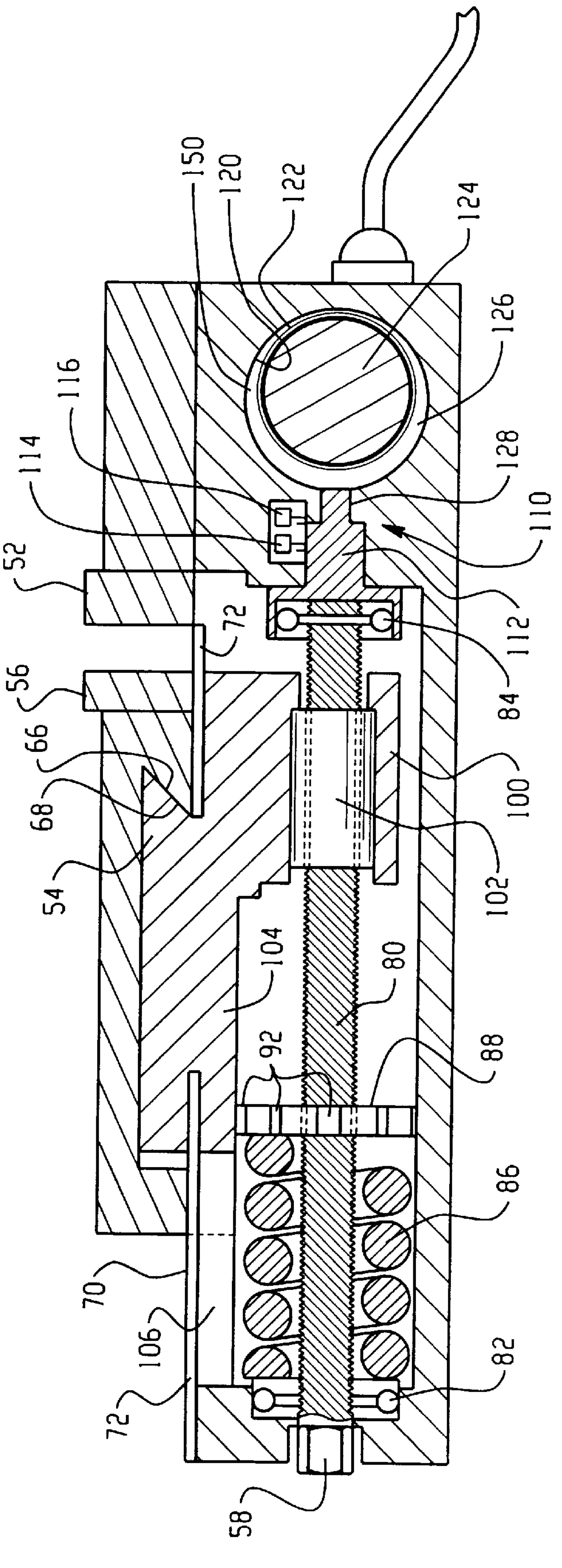
FIG. 4 is a longitudinal sectional view of the vise of FIGS. 2 and 3.

With reference to FIG. 4, the hex drive 58 is connected to and preferably integral with a threaded shaft or lead screw 80. The threaded lead screw 80 is supported at its inner end by a first race of a rolling bearing 82. At its outer end, the threaded shaft passes slidably through a rolling bearing 84. A first race of the bearing 82 is supported on the vise body 50 and a second race supports a spring 86. The spring 86 is clamped between the second race of bearing 82 and a spring retainer nut 88 which is threadedly received on the lead screw 80. To preset the spring force for various clamping forces, a nut retainer tool (which may be a screwdriver) is inserted through body access hole 94 (FIG. 3) to engage the retainer nut in a groove 92 and prevent its rotation. Turning the threaded lead screw 80, via the hex drive 58, changes the preload setting of the spring 86. After this preload adjustment, the nut retainer tool is removed for normal vise operation. The threaded lead screw 80 is supported between bearings 82 and 84. After removal of the nut retainer tool, subsequent turning of the lead screw 80 via hex 58 will only adjust the jaw position (and not change the spring preload).

A jaw drive traveler 100 carries a floating jaw drive nut 102 that is threadedly received on the threaded lead screw 80. The traveler is connected with an arm or traveller 104 which is received in a longitudinal guideway or keyway 106 at the top of the vise body. The wedge jaw carrier 54 is connected with the top of the arm 104. The interaction of the arm 104 and the longitudinal guideway 106 prevents the traveler and the floating nut drive 102 from rotating with the lead screw 80. In this manner, as the hex drive 58 and lead screw 80 are rotated, the traveler, hence, the wedge jaw carrier, are caused to move linearly toward and away from the stationary reference jaw 52.

In practice, machine assemblies are rarely perfect. The floating drive nut in the follower not only provides low friction, but allows the center line of the lead screw 80 to be set by the bearings at its end points. The floating drive nut is free to move upward or downward to seek its own center. In this manner, distortions in the lead screw 80 do not provide upward or downward forces on the jaw. Rather, the trajectory of the jaw is independent of the axis of the lead screw.

The vise can be used manually by positioning a turn handle on the hex drive shaft 58 and rotating the shaft until the workpiece is clamped between the jaws. With further rotation of the hex drive, the threads on the lead screw 80 cam the lead screw 80 towards the hex drive, compressing the spring 86. In this manner, the spring 86 limits the pressure that the jaws can place on the clamped workpiece.

In the preferred electrical mode of operation, the vise is operated in the manual mode during setup on a sample workpiece. The hex nut is turned until the workpiece is clamped with the prescribed force and the spring 86 commences to compress. An electrical actuator 110 is operated to move a piston 112 that supports a second race of bearing 84 axially, pushing the bearing 84, the threaded lead screw 80, the traveler 104 and, hence, the movable vise jaw 56, away from the stationary vise jaw 52. The distance that the vise jaws are moved apart does not need to be large. Typically, a few thousandths of an inch, e.g., 0.40–0.60 inches, is sufficient to release the workpiece. A pair of limit switches 114, 116 monitor movement of the electrical actuator 110 for controlling the movement of the piston. More specifically to the preferred embodiment, the piston includes an enlarged end in which the outer race the bearing 84 is received. The opposite side of the piston enlarged end forms a support surface which engages the vise body 50 to limit movement of the bearing 84. The electrical actuator 110 moves the piston to lift the housing engaging surfaces of the piston off the housing. In this manner, the zero position of the vise is accurately settable.

Preferably, the piston is preloaded to a gap of about 0.080 inches by the pressurized polymer. This margin allows and amount of polymer loss over the operating life (reducing the gap to “0”).

One advantage of the vise which is in a normally clamped state is that the electric power can be disconnected from the vise and it can be transported freely to remote locations, even to other facilities, without changing the orientation of the part in the vise.

In the preferred embodiment, one of the LEDs is red and is illuminated to indicate when power is being applied to the electrical actuator. The other LED is green and is set to be illuminated when the desired clamping pressure is achieved. At the manual loading station 14, when the operator presses the foot pedal 16, the red light comes on. After the workpiece is loaded, the foot pedal is released. The electrical actuator is deactuated. In the preferred polymer actuator described below, the polymer cools and contracts, preferably in about 0.5–3.0 seconds. The green light becomes lit, indicating that the desired clamping pressure has been achieved. In the preferred embodiment, the green light is controlled by the limit switches 114, 116. When the actuator is turned off and retracts, the spring 86 should move the threaded shaft 80 and the jaw a prescribed distance, e.g., 0.40–0.60 inches. If the travel is excessive, the spring may be out of its prescribed compression range and the green light does not light. More specifically, the limit switch is set, in a preferred embodiment, such that the green light is lit between 0.40–0.60 inches, but not at greater or lesser travels.

In the preferred embodiment, the actuator 110 is an thermochemical actuator. More specifically, the actuator includes a bore or annular passage 120 extending transversely to the vise. Electrical heating wires 122 are wound on and supported by a bobbin 124 which holds them centrally in the annular passage between the bobbin and the actuator housing. The annular passage is filled with a thermally expansible polymer 126, e.g., paraffin or wax, and its ends sealed. Centrally along the tube, an outlet port 128 is defined in which the bearing carrying piston 112 is mounted. To retract the jaws of the vise, an electrical current is applied to the heating wires 122, heating the polymer and causing it to expand. Preferably, the polymer undergoes a solid-liquid phase change which amplifies the expansion. The expanding polymer presses against and urges the actuator piston 112 to move outward. When the next workpiece is positioned and ready to be clamped, electrical power to the winding is terminated, allowing the polymer to cool and contract, drawing the piston 112 back. In the preferred embodiment, the spring 86 extends, urging the piston 112 back into the housing of the actuator 110. The vise and the housing of the thermochemical actuator are preferably constructed of aluminum or other materials which dissipate heat quickly. The more quickly the heat from the polymer is dissipated, the faster the vise closes. With a thin, annular passage for the polymer, retraction times in a fraction of a second are readily obtainable, e.g., 0.5–3.0 seconds. Optionally, water can be circulated adjacent the polymer for quicker cooling and faster reaction times. As yet another option, hot water or other hot fluids can be used to melt or expand the polymer.

Figure 7:
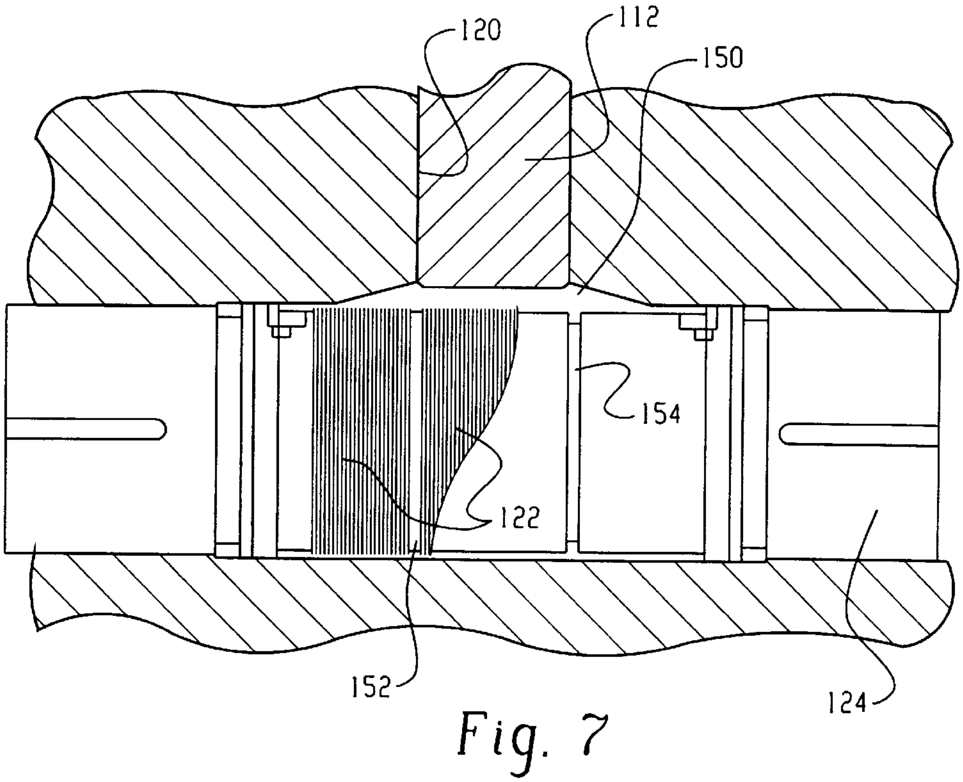
FIG. 7 is a transverse sectional view of the polymeric actuator.

With reference to FIG. 7, the central bobbin 124 supports the series of annular windings 122 spaced between the bobbin and the peripheral outer surface of the tubular polymer receiving region. The outer housing defines the bore 120 in which the piston 112 is received. In the preferred embodiment, the wires are kept barely warm in the rest position such that there is a very slight amount of liquefied polymer around the wires. For actuation, the amount of current is increased, melting more polymer, which expands and flows into the piston bore. At the end of an actuation, the heating wires are turned off or down, allowing the polymer to cool and retract. The polymer tends to cool and solidify from adjacent the housing surface and the bobbin surface. To provide greater flow capability adjacent the bore, the gap 150 adjacent the bore is enlarged to provide for sufficient flow capacity even as the polymer cools. Flow efficiency is also improved by leaving gaps 152 in the windings in areas of peak flow. This permits the polymer to flow through the gaps more quickly without being obstructed by the wires. Preferably, this extra flow capacity is improved still further by annular grooves 154 in the bobbin below the winding gaps. The housing can be enlarged in both the radial and the longitudinal direction. The greater enlargement is in the direction of greatest flow distance. In the illustrated embodiment in which the flow path from the bore longitudinally are shorter than flow dimensions peripherally, the enlargement is greater in the peripheral direction. In the preferred embodiment, this enlargement is achieved simply by placing the bobbin eccentrically within a cylindrical bore of the housing.

The force with which the electrochemical actuator is operating can be determined from the temperature of the wax and the amount of displacement. A simple look-up table can be addressed with these two characteristics to determine the force. The temperature of the polymer can be measured easily through the resistance of the resistance heater windings 122. Winding materials with a positive temperature coefficient, such as copper, molybdenum, and tungsten, have resistances which change with polymer temperature.

Figure 5:
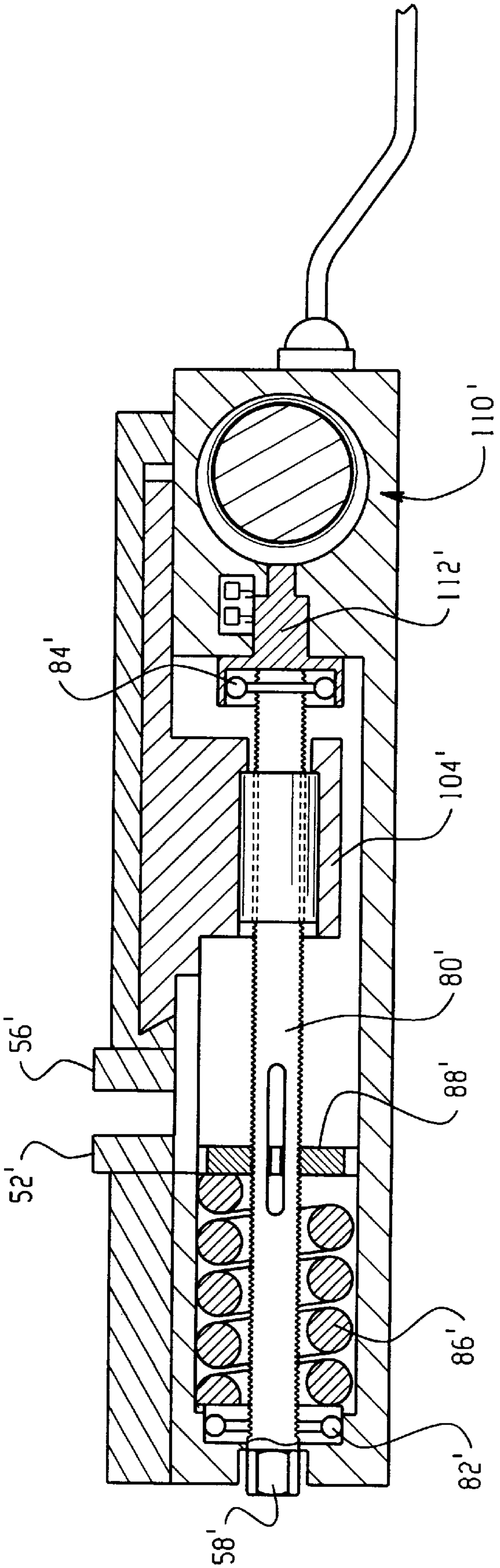
FIG. 5 is a sectional view of an alternate embodiment of the vis o FIGS. 2–4.

With reference to FIG. 5, the electrochemical actuator can also be used to drive the jaws closed. More specifically, rotating a hex drive 58' rotates a screw 80' causing a follower 104' to move longitudinally. The follower is connected with a movable jaw 56' of the vise. In this manner, rotating the hex drive 58' sets a distance between the moving jaw 56' and a stationary jaw 52'. An electrochemical actuator 110' is connected with a piston 112' which moves a bearing assembly 84' into which the threaded lead screw 80' is journalled longitudinally, forcing the jaws closed. The amount of pressure generated can be controlled by monitoring the state of the polymer and controlling the percentage of the polymer which changes phase. With the preferred electrochemical actuator, forces of 10,000–20,000 psi are attainable. Optionally, a compression spring 86' and a retainer nut 88' are mounted between the threaded shaft and a stationary bearing 82' to limit pressure and provide a positive return force on the piston. Alternately, the thermochemical actuator is reoriented or modified to apply force in an appropriate direction.

Figure 6:
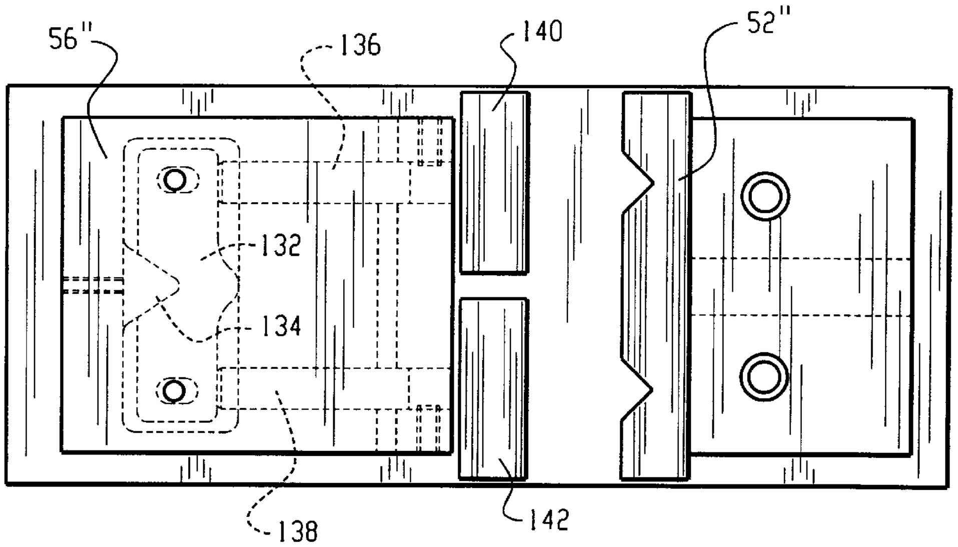
FIG. 6 is a top view of a twin compensating jaw set.

With reference to FIG. 6, a twin compensating jaw set is preferred. In the twin compensating jaw set, the wedge jaw carrier carries a movable jaw body 56". The jaw body includes a rocker element 132 which has a pair of arms to either side of a pivot 134. A pair of rocker arm extensions or pins 136, 138 extend between each of the rocker arms and workpiece engaging jaw faces 140, 142. In this manner, as the jaw elements 140, 142 engage two workpieces, they both press against the workpiece with the same force. If one of the elements 140, 142 experiences a greater clamping force, the rocker arm 132 is driven to pivot until the forces are balanced.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A clamping device comprising:
- first and second clamping elements, at least one of which is movable between an open position for receiving a workpiece and a clamped position for holding the workpiece;
- a polymeric actuator for controlling movement of the at least one clamping element between the open and clamped positions, the polymeric actuator including:
  - a housing which defines a polymer containing chamber;
  - a polymer disposed in the chamber which expands and contracts under heating and cooling;
  - a driving element movably mounted in fluid communication with the chamber for extending and retracting as the polymer expands and contracts, the driving element being connected with at least one of the clamping elements for driving the elements toward one of the open and clamped positions as the polymer expands.

2. The clamping device as set forth in claim 1 wherein:
- a first of the clamping elements is mounted on a follower which is threadedly received on a threaded shaft; and,
- the polymeric actuator is connected with the shaft for moving the shaft longitudinally.

3. The clamping device as set forth in claim 2 further including:
- a spring element connected with the shaft for biasing the shaft against the polymeric actuator.

4. The clamping device as set forth in claim 3 further including:
- a compression adjustment for adjusting the spring element to adjust an amount of force which the spring exerts on the threaded shaft.

5. The clamping device as set forth in claim 4 wherein the polymeric actuator is connected with the shaft to push the at least one clamping element toward the open position and the spring is connected with the threaded shaft to push the at least one clamping element towards the clamped position, adjustment of the spring compression adjusting an amount of pressure with which the clamping elements grip the workpiece.

6. The clamping device as set forth in claim 1 wherein the polymeric actuator is connected with at least one of the clamping elements for driving the clamping elements toward the clamping position.

7. The clamping device as set forth in claim 1 wherein the polymeric actuator further includes:
- a generally circular bore defined in the housing;
- a drive element receiving port within which the drive element is slidably mounted;
- a substantially circular bobbin carrying an electrical heater, the bobbin being disposed eccentrically within the bore to define an annular polymer receiving chamber which is thicker toward the drive element receiving port and thinner opposite the driving element receiving port.

8. The clamping device as set forth in claim 7 wherein the bobbin includes annular grooves to provide larger capacity flow channels for the polymer.

9. The clamping device as set forth in claim 1 further including:
- an electrical heater element for electrically heating the polymer to change the polymer from a solid phase to a liquid phase.

10. The clamping device as set forth in claim 9 wherein the electric heating element is constructed of a positive temperature coefficient wire such that changes in its resistance are indicative of polymer temperature, and further including:
- displacement sensors for sensing displacement of the drive element; and,
- an indicator light system for indicating when a selected clamping force has been achieved based on the sensed displacement and the polymer temperature.

11. The clamping device as set forth in claim 9 further including:
- a foot pedal switch connected between the electrical heater element and a source of electrical power for controlling actuation of the polymeric actuator.

12. The clamping device as set forth in claim 9 further including:
- a computerized controller connected with the electrical heater element and at least one metal removal tool for coordinately controlling clamping of the workpiece and at least one metal removal operation on the clamped workpiece.

13. The clamping device as set forth in claim 1 wherein the clamping elements include:
- at least one stationary element for engaging first and second workpieces;
- first and second movable clamping elements for engaging the first and second workpieces;
- a common carrier member for carrying the first and second movable clamping elements;
- a force equalizing means supported by the carrier and connected between the first and second movable clamping elements for equalizing the force applied to the first and second workpieces.

14. The clamping device as set forth in claim 13 wherein the force equalizing means includes:
- a rocker element pivotally mounted to the carrier, the rocker element having a pair of arms disposed to opposite sides of a pivot, each of the arms being connected with one of the first and second movable clamping elements.

15. The clamping device as set forth in claim 1 wherein the polymeric actuator further includes:

a bore defined in the housing, the driving element being received through a port connected with the bore;

a bobbin disposed eccentrically within the bore to define an annular polymer receiving chamber which is thicker toward the driving element receiving port and thinner opposite the drive element receiving port;

a heater in thermal communication with the polymer for selectively expanding the polymer.

16. A clamping device comprising:

first and second clamping elements, at least one of which is movable between an open position for receiving a workpiece and a clamped position for holding the workpiece;

an electrically controlled actuator for controlling movement of the at least one clamping element between the open and clamping positions, wherein the electrically controlled actuator includes:

a housing which defines a polymer containing chamber;

a polymer disposed in the chamber which expands and contracts under heating and cooling;

an electrical element thermally connected with the polymer for controlling expansion and contraction of the polymer; and a driving element movably mounted in fluid communication with the chamber for extending and retracting as the polymer expands and contracts, the driving element being connected with at least one of the clamping elements for driving the element toward one of the open and clamped positions as the polymer expands.

17. The clamping device as set forth in claim 16 wherein:

a first of the clamping elements is mounted on a follower which is threadedly received on a threaded shaft;

the electrically controlled actuator is connected with the shaft for moving the shaft longitudinally; and a spring element is connected with the shaft for biasing the shaft against the electrically controlled actuator.

18. A clamping method comprising:

mechanically biasing first and second clamping elements toward each other with a clamping force;

thermally expanding a polymer to move the clamping elements apart against the mechanically biased clamping force;

placing a workpiece between the clamping elements;

cooling and contracting the polymer such that the clamping elements are mechanically biased together to clamp the workpiece with the clamping force.

* * * * *